US009588677B2

United States Patent
Relyea et al.

(10) Patent No.: US 9,588,677 B2
(45) Date of Patent: Mar. 7, 2017

(54) SYSTEMS AND METHODS FOR TOUCH-SCREEN-BASED REMOTE INTERACTION WITH A GRAPHICAL USER INTERFACE

(71) Applicant: Verizon Patent and Licensing Inc., Arlington, VA (US)

(72) Inventors: Donald H. Relyea, Dallas, TX (US); Andrew Allman, Dallas, TX (US); Ryan J. Trees, Frisco, TX (US); George M. Higa, Plano, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 174 days.

(21) Appl. No.: 14/147,490

(22) Filed: Jan. 3, 2014

(65) Prior Publication Data
US 2015/0193138 A1    Jul. 9, 2015

(51) Int. Cl.
*G06F 3/0488* (2013.01)
*G06F 3/0482* (2013.01)
(Continued)

(52) U.S. Cl.
CPC ........ *G06F 3/04883* (2013.01); *G06F 3/0482* (2013.01); *G06F 3/04812* (2013.01); *G06F 3/04842* (2013.01); *H04N 21/4222* (2013.01); *H04N 21/42224* (2013.01); *H04N 21/47202* (2013.01); *H04N 21/47217* (2013.01); *H04N 21/4821* (2013.01)

(58) Field of Classification Search
CPC ...... G06F 3/017; G06F 3/0488; G06F 3/0481; G06F 3/0317; G06F 2200/1637; G06F 2203/0384; G06F 3/03547; G06F 2203/04104; H04L 67/36; H04N 1/00392; H04N 21/4821; H04N 21/482; H04N 21/440263; H04N 21/234363; H04N 21/42206
USPC ............. 701/1, 400; 345/173, 156, 169, 157
See application file for complete search history.

(56) References Cited

U.S. PATENT DOCUMENTS 8,316,319 B1 *  11/2012  Patel et al. .................... 715/810
8,869,062 B1 *  10/2014  Voorhees et al. ............. 715/784
(Continued)

OTHER PUBLICATIONS

"Turn Your Android Phone into a Remote Control for Your PC", How to Geek, Jul. 20, 2010, available at http://www.howtogeek.com/howto/22506/turnyourandroidphoneintoaremotecontrolforyourpc/.*

*Primary Examiner* — Ricky Chin
*Assistant Examiner* — Krista A Contino Saumby

(57) ABSTRACT

In an exemplary method, a user interface system receives touch screen input data representative of a touch screen input provided by a user on a touch screen of a remote control device configured to communicate wirelessly with an electronic device that provides a graphical user interface ("GUI") for display on a display screen, converts the touch screen input to GUI input associated with the GUI provided by the electronic device for display on the display screen, and applies the GUI input to the GUI displayed on the display screen. In certain examples the user interface system converts the touch screen input to GUI input in accordance with a touch-screen-based directional-hop movement mode or a touch-screen-based free-cursor directional movement mode.

22 Claims, 11 Drawing Sheets

(51) Int. Cl.
*G06F 3/0481* (2013.01)
*G06F 3/0484* (2013.01)
*H04N 21/422* (2011.01)
*H04N 21/472* (2011.01)
*H04N 21/482* (2011.01)

(56) References Cited

U.S. PATENT DOCUMENTS

| | | | |
|---|---|---|---|
| 9,465,532 B2* | 10/2016 | Trent, Jr. | G06F 3/04883 |
| 2003/0038821 A1* | 2/2003 | Kraft | G06F 3/04886 |
| | | | 345/629 |
| 2010/0153996 A1* | 6/2010 | Migos | G06F 3/0425 |
| | | | 725/39 |
| 2013/0179925 A1* | 7/2013 | Woods | H04N 21/42209 |
| | | | 725/42 |
| 2013/0339991 A1* | 12/2013 | Ricci | 725/14 |

* cited by examiner

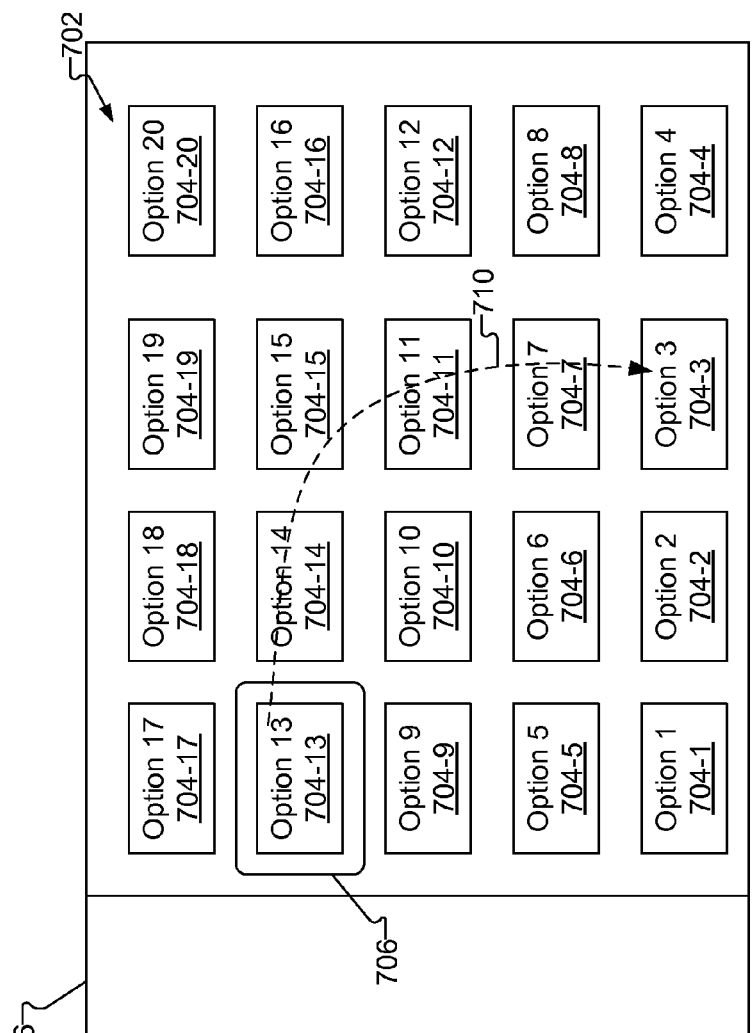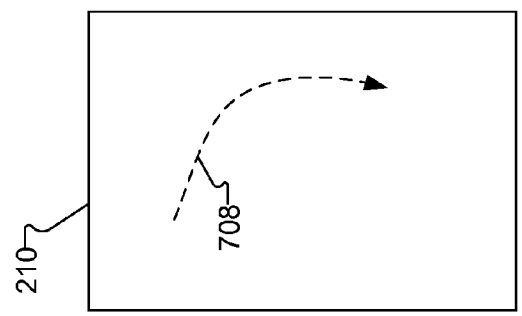
Fig. 7

SYSTEMS AND METHODS FOR TOUCH-SCREEN-BASED REMOTE INTERACTION WITH A GRAPHICAL USER INTERFACE

BACKGROUND INFORMATION

Remote control devices are commonly used to operate a wide variety of consumer electronic devices. For example, a handheld infrared remote control device is commonly used to operate a television device, a set-top-box device, a stereo system, an entertainment system, or any other similar type of electronic device.

The use of a remote control device to control an electronic device provides a user of the remote control device with a certain level of convenience. However, the user may experience difficulty, inconvenience, and/or frustration when using conventional input methodologies of a remote control device to interact with certain graphical user interfaces provided by some electronic devices. For example, use of a directional pad of a remote control device by a user to navigate through extensive options presented in a graphical user interface displayed by a television device may be tedious.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 3-9 illustrate examples of mappings of touch screen input on a touch screen of a remote control device to operations in a graphical user interface displayed on a display screen according to principles described herein.

DETAILED DESCRIPTION OF PREFERRED EMBODIMENTS

Exemplary systems and methods for touch-screen-based remote interaction with a graphical user interface ("GUI") are described herein. In certain examples, systems and methods described herein may perform one or more operations to facilitate a user remotely interacting, by way of a touch screen of a remote control device, with a GUI provided by an electronic device for display on a display screen. The interactions may allow the user to remotely control one or more operations of the GUI and/or the electronic device. For example, the user may provide touch screen input to conveniently, intuitively, and/or efficiently navigate user selectable options (e.g., various menus and sub-menus of user selectable options) included in the GUI. Such interactions may provide the user with a more convenient, intuitive, and/or efficient user interface experience, as compared to experiences provided by user input configurations that rely exclusively on conventional remote control input methodologies, such as directional-pad-based remote control input methodologies that are commonly used to control consumer electronics entertainment devices. In certain examples, one or more of the operations performed by systems and methods described herein may be well-suited for user interaction with a GUI provided by an electronic device that is traditionally controlled by directional-pad-based remote control input methodologies. Exemplary methods and systems for touch-screen-based remote interaction with a GUI will now be described in reference to the drawings.

Figure 1:
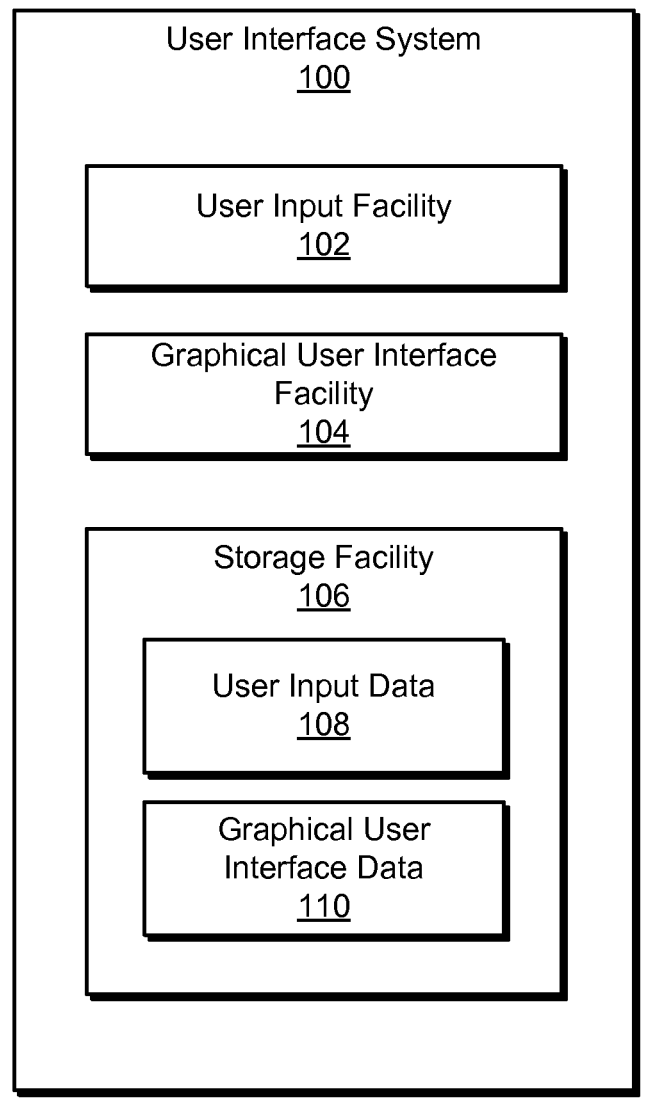
FIG. 1 illustrates an exemplary user interface system according to principles described herein.

FIG. 1 illustrates an exemplary user interface system 100 ("system 100"). As shown, system 100 may include, without limitation, a user input facility 102, a graphical user interface facility 104 ("GUI facility 104"), and a storage facility 106 selectively and communicatively coupled to one another. Any suitable communication technologies may be employed to facilitate communications between facilities 102-106.

Although facilities 102-106 are shown to be separate facilities in FIG. 1, any of those facilities may be combined into a single facility or split into additional facilities as may serve a particular implementation. Additionally or alternatively, one or more of the facilities 102-106 may be omitted from and external to system 100 in other implementations. Facilities 102-106 of system 100 may include or be otherwise implemented by one or more computing devices configured to perform one or more of the operations described herein. In such implementations, system 100 may be referred to as a computer-implemented system 100. Facilities 102-106 will now be described in more detail.

Storage facility 106 may maintain user input data 108 received, generated, and/or used by user input facility 102 and representative of user input received by system 100. Storage facility 106 may also maintain graphical user interface data 110 ("GUI data 110") generated and/or used by GUI facility 104, such as data representative of a GUI and/or GUI views generated and provided by GUI facility 104 for display on the display screen. GUI data 110 may also include GUI input data representative of GUI input configured to be applied to a GUI, such as described herein. Storage facility 106 may maintain additional or alternative data as may serve a particular implementation.

User input facility 102 may be configured to receive user input data representative of user input provided by a user by way of a remote control device. For example, user input facility 102 may receive touch screen input data representative of touch screen input provided by a user on a touch screen of a remote control device. User input facility 102 may receive user input data in any suitable way. For example, user input facility 102 may receive touch screen input data directly from a touch screen component of a remote control device or by way of a wireless transmission of signaling (e.g., by way of Wi-Fi, radio frequency, BLUETOOTH, and/or other wireless signaling) representative of the touch screen input data.

The touch screen input represented by the touch screen input data may include any form of input that may be provided by a user on a touch screen. As an example, the touch screen input may include a single tap, a double tap, a triple tap, or any other number of quick taps at a location on the touch screen. Additionally or alternatively, the touch screen input may include a touch-and-hold input (e.g., a touch and hold of a finger of a user on a location of the touch screen device for a predefined length of time). Additionally or alternatively, the touch screen input may include gesture input, such as a swipe of a finger of the user in one or more directions along the surface of the touch screen.

Touch screen input data may represent one or more attributes of touch screen input. For example, touch screen input data may represent a location of touch screen input on a touch screen, a direction of touch screen input, a speed of touch screen input, an acceleration associated with touch screen input, a distance of touch screen input, etc. To illustrate one example, a touch gesture may include a direction component and a distance component. Accordingly, touch screen input data representative of the touch gesture may include data representing the direction component and the distance component of the gesture input. For example, a swipe of a finger from left to right a certain distance on a surface of a touch screen may have a "right" direction component representing the left-to-right direction and a distance component representing the distance of the swipe of the finger on the touch screen. The distance may be represented by any suitable units, such as a number of pixels of the touch screen that are traversed by the swipe.

User input facility 102 may be configured to perform one or more operations to process received touch screen input data. For example, user input facility 102 may use received touch screen input data to convert the touch screen input represented by the touch screen input data to GUI input associated with a GUI displayed on a display screen of a display device. In certain examples, user input facility 102 may convert the touch screen input to GUI input based on an active touch-screen-based input mode. Examples of touch-screen-based input modes and corresponding conversions of touch screen input to GUI input are described herein.

User input facility 102 may output data representative of the GUI input to GUI facility 104 or storage facility 106 for use by the GUI facility 104 in relation to the displayed GUI. GUI input converted from the touch screen input may be in any format that is usable by GUI facility 104 to apply one or more attributes of the touch screen input to the displayed GUI. Examples of GUI input and of GUI facility 104 applying GUI input converted from touch screen input are described herein.

GUI facility 104 may be configured to perform any of the GUI operations described herein, including providing a GUI for display on a display screen of a display device. GUI facility 104 may provide the GUI for display on the display screen in any suitable way, such as by rendering the GUI and/or transmitting data representative of the GUI to the display device and/or one or more components of the display device.

The GUI may include any GUI that may be displayed on a display screen and with which a user may interact by way of a remote control device. In certain examples, the GUI may include one or more selectable options that are navigable and selectable by a user interacting with the display screen. For example, the GUI may include one or more navigable grids of user selectable options, which may be arranged in one or more views of the GUI and/or to form one or more menus and/or sub-menus of user selectable options. A grid of user selectable options may include any navigable arrangement of the user selectable options, such as a single row of user selectable options, a single column of user selectable options, a combination of rows and/or columns of user selectable options, a two-dimensional matrix grid of user selectable options, hierarchically interconnected menus and sub-menus of user selectable options, etc. Examples of grids of user selectable options are illustrated herein.

GUI facility 104 may receive data representative of GUI input from user input facility 102 or storage facility 106 and perform one or more operations to process the GUI input. For example, GUI facility 104 may apply the GUI input to a displayed GUI and/or to operation of an electronic device providing the GUI for display. As an example, application of the GUI input may include updating the GUI such as by changing one or more attributes of the GUI. As another example, application of the GUI input may include GUI facility 104 directing the electronic device providing the GUI to perform one or more operations. To support application of GUI input, GUI facility 104 may map specific GUI inputs to operations such as user interface operations and/or other operations of the electronic device providing the GUI, such as based on predefined relationships between the operations and the GUI inputs. Examples of applications of GUI inputs converted from touch screen inputs are described herein.

In certain examples, GUI facility 104 may provide a GUI that is part of a media service user interface of a media service. The media service may include any service provided by a service provider and through which an end user of the media service may discover, access, and/or consume media content and/or information associated with the media content. The media service user interface may include any types of user interfaces suitable for facilitating user interaction with the media service. For example, the media service user interface may include the GUI provided by GUI facility 104, and the GUI may include any type of GUI related to the media service. In certain examples, for instance, the GUI may include any of an electronic program guide (e.g., an electronic program guide for scheduled television programming), a media-on-demand content browse interface within which a user may browse for and access media-on-demand content, a media content playback interface in which media content may be played back (e.g., video content may be displayed) for experiencing by the user, a media service menu interface for the media service, a settings interface for the media service, and any other GUI through which the user may interact with the media service.

Figure 2:
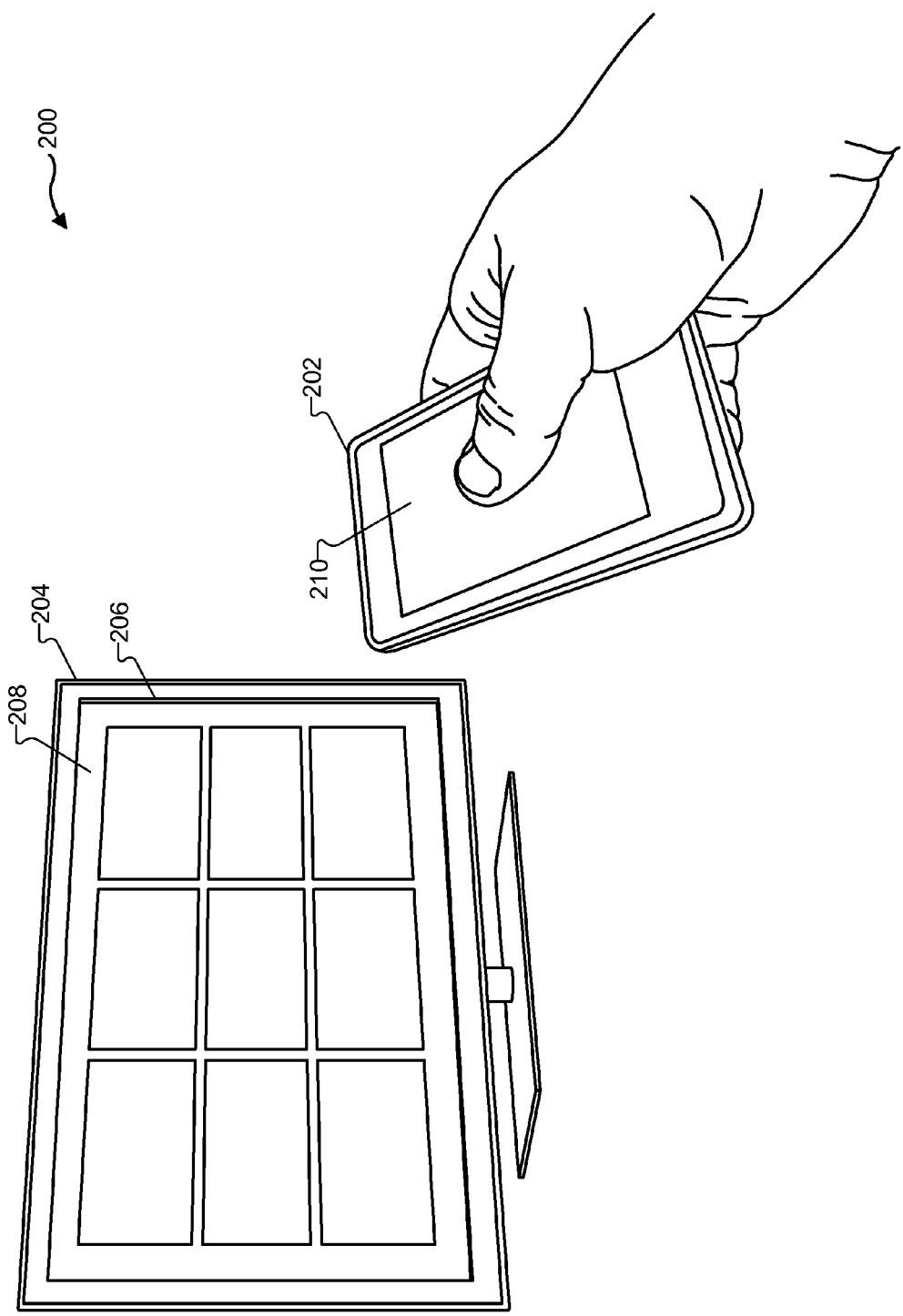
FIG. 2 illustrates an exemplary implementation of the system of FIG. 1 according to principles described herein.

FIG. 2 illustrates an exemplary implementation 200 of system 100 in which an exemplary remote control device 202 is configured to communicate with an electronic device 204 configured to provide a GUI for display on a display screen 206 and with which a user may interact by providing input by way of the remote control device 202. In the illustrated example, a GUI 208 is displayed on the display screen 206 and includes a grid of user selectable options (e.g., a grid of box images) that may be navigated by a user providing input by way of the remote control device 202.

The remote control device 202 and the electronic device 204 may be discrete, standalone devices that may be located physically remote one from another. For example, a user may hold the remote control device 202 at a variety of distances away from the electronic device 204, such as across a room from the electronic device 204. The remote control device 202 and the electronic device 204 may communicate one with another using any suitable wireless communication technologies. For example, the remote control device 202 and the electronic device 204 may communicate by way of a wireless local area network (e.g., a Wi-Fi network), a direct wireless connection, radio frequency signaling, infrared signaling, BLUETOOTH, and/or other wireless signaling technologies. Accordingly, the remote control device 202 may be able to communicate with the electronic device 204 from a variety of distances away from the electronic device 204.

The electronic device 204 may include any electronic device configured to provide GUI 208 for display on a display screen and receive input signaling provided by the remote control device 202. In the illustrated example, the electronic device 204 is a display device with an integrated display screen 206. In other examples, the electronic device 204 may be another standalone electronic device communicatively connected to a display device and configured to provide the GUI 208 to the display device for display on the display screen. As an example, the electronic device 204 may include a television (e.g., a smart television), a set-top box device, a DVR device, a gaming console device, an entertainment gateway device, or any other electronic device configured to provide the GUI 208 for display on the display screen 206 and receive and process signaling provided by the remote control device 202. In certain examples, the electronic device 204 may be configured to facilitate user access to a media service, such as by way of the GUI provided for display by the electronic device 204.

In the example illustrated in FIG. 2, remote control device 202 includes a touch screen 210 integrated within the remote control device 202 and configured for use by the user to provide touch screen input to interact with the GUI 208 and/or control operation of the electronic device 204. The remote control device 202 shown in FIG. 2 is illustrative of one example of a remote control device that may be used by a user to provide touch screen input to the electronic device 204 as described herein. Other suitable touch screen remote control devices may be used in other implementations in accordance with the principles described herein.

The remote control device 202 may be configured in any suitable way to function as a remote control device for the electronic device 204. For example, the remote control device 202 may run an operating system process, firmware, or an installed application (e.g., a mobile "app") that configures the remote control device 202 to remotely control the electronic device 204 (e.g., to communicate with and function as a touch-screen-based remote control device for the electronic device 204). The remote control device 202 may include any suitable user device, such as a tablet computer, smartphone, personal digital assistant ("PDA"), handheld computing device, or any other similar user device having a touch screen and configured to wirelessly communicate with electronic device 204 and function as a remote control device for the electronic device 204.

In certain examples, in addition to being configured to receive input data from the remote control device 202, the electronic device 204 may be configured to receive user input data from one or more other remote control devices configured to communicate wirelessly with the electronic device 204. For example, the electronic device 204 may be configured to receive user input data from a traditional remote control device having a directional pad that includes a set of directional arrow buttons configured to be actuated by a user to provide directional input to the electronic device 204. For instance, the electronic device 204 may receive, from such a remote control device, directional-pad input data representative of a user actuation of a directional arrow button of the directional pad of the remote control device. The electronic device 204 may apply such a user input to the GUI 208 in any suitable way, such as by moving a selector object one hop in a direction of the directional arrow button within a grid or user selectable options in the GUI 208, for example.

System 100 may be implemented in implementation 200 in any suitable manner. For example, one or more components of system 100 may be implemented entirely by the remote control device 202, entirely by the electronic device 204, or distributed across the remote control device 202 and the electronic device 204. For example, GUI facility 104 may be implemented as firmware and/or an installed application on the electronic device 204 and configured to provide the GUI 208 for display on the display screen 206. User input facility 102 may be implemented as firmware and/or an installed application on the remote control device 202, the electronic device 204, or distributed across the remote control device 202 and the electronic device 204. In certain examples, system 100 may be implemented entirely by the electronic device 204. In some alternative embodiments, system 100 may be at least partially implemented by one or more systems and/or devices separate from remote control device 202 and electronic device 204. For example, system 100 may be at least partially implemented by a server remote from remote control device 202 and electronic device 204.

As mentioned, user input facility 102 may be configured to convert touch screen inputs to GUI inputs, which may be pre-associated with operations of the GUI 208 and/or the electronic device 204 such that an application of the GUI inputs to the GUI 208 includes performance of operations pre-associated with the GUI inputs. Through such conversion, touch screen inputs may be mapped to operations of the GUI 208 and/or the electronic device 204 such that a user may provide touch screen inputs to interface with the GUI 208 and/or the electronic device 204.

To illustrate, touch screen inputs such as single taps, double taps, triple taps, any other number of quick taps, touch-and-hold inputs, and touch gestures may map to certain operations of the GUI 208 and/or the electronic device 204 and may be provided by a user to interact with and/or control operations of the GUI 208 and/or the electronic device 204. As an example, a single-tap touch input on a user selectable option may cause the option to be selected, which may cause one or more operations associated with the option to be performed, such as a navigation down one hierarchical level in the GUI 208 and/or a launch of a particular GUI view related to the option. As another example, a double-tap touch input may trigger a navigation up one hierarchical level in the GUI 208, such as by launching the next immediate menu above a currently selected menu in the GUI 208. Alternatively, a double-tap touch input on a user selectable option may cause the option to be selected, and a triple-tap touch input may trigger a navigation up one hierarchical level in the GUI 208. As another example, a press-and-hold touch input may cause a pre-associated operation to be performed, such as a launch of a contextually selected information window for display in the GUI 208. As another example, a touch gesture across the surface of the touch screen may cause a directional movement of a selector object within a displayed view of the GUI 208. As another example, a touch gesture such as a directional swipe having a speed or acceleration component that satisfies a minimum threshold may cause performance of a pre-associated operation, such as a page scroll operation (e.g., a page-up or page-down operation).

System 100 may be configured to map touch screen inputs to operations of the GUI 208 and/or the electronic device 204 in accordance with an active touch-screen-based input mode. To this end, in certain examples, system 100 may be able to operate in accordance with any of a plurality of different touch-screen-based input modes that is currently active. System 100 may switch modes by deactivating a currently active touch-screen-based input mode and activating a different touch-screen-based input mode in response to an occurrence of any predefined event, such as in response to user input requesting that a touch-screen-based input mode be made active, a providing of a particular view of the GUI 208 (e.g., an electronic program guide view, a mediaon-demand content browse view, etc.), a login of a particular user, a receipt of touch screen input from a particular remote control device or type of remote control device, and/or any other predefined event.

As mentioned, certain touch screen input may be used to cause movement within a view of the GUI 208 displayed on the display screen 206. Such movement may include any movement within the plane of the display screen 206, including movement of a selector object displayed in the view of the GUI 208.

In certain examples, a touch-screen-based input mode may include one or more touch-screen-based directional movement modes ("directional movement modes") that govern how a selector object is moved within a displayed view of the GUI 208 in response to touch screen input. System 100 may be configured to operate in accordance with any of such directional movement modes that is active. In certain examples, system 100 may switch from operating in accordance with one directional movement mode to operating in accordance with another directional movement mode by deactivating the active directional movement mode and activating the other directional movement mode in response to an occurrence of a predefined event, such as described herein. Examples of directional movement modes will now be described.

In certain examples, system 100 may operate in accordance with a touch-screen-based directional-hop movement mode. In this mode, GUI facility 104 may persistently position a selector object in the form of a highlighter object to highlight a user selectable option included in a view of the GUI 208 displayed on the display screen 206. At any given time during the display of a view of the GUI 208 on the display screen 206, the highlighter object is displayed on-screen to highlight a user selectable option included in the view of the GUI 208. GUI facility 104 may be configured to move the highlighter object in one or more directions within the plane of the display screen 206 and between user selectable options in the GUI 208 by "hopping" (e.g., moving) the highlighter object from user selectable option to user selectable option by a number of hops in a particular direction.

Conventionally, such hops may correspond to user actuations of directional arrow buttons on a directional pad of a traditional remote control device. For example, a single hop may be performed in response to a single user actuation of a directional arrow button. However, such actuations of directional arrow buttons to move a considerable number of hops may be tedious, repetitive, and/or slow to a user. System 100 may be configured to map touch screen inputs to such hops in accordance with the touch-screen-based directional-hop movement mode, which may provide the user with a more convenient, intuitive, and/or efficient user experience.

FIGS. 3-7 illustrate examples of mappings of touch screen input provided by a user on the touch screen 210 of the remote control device 202 to operations in the GUI 208 displayed on the display screen 206 in accordance with a touch-screen-based directional-hop movement mode.

Figure 3:
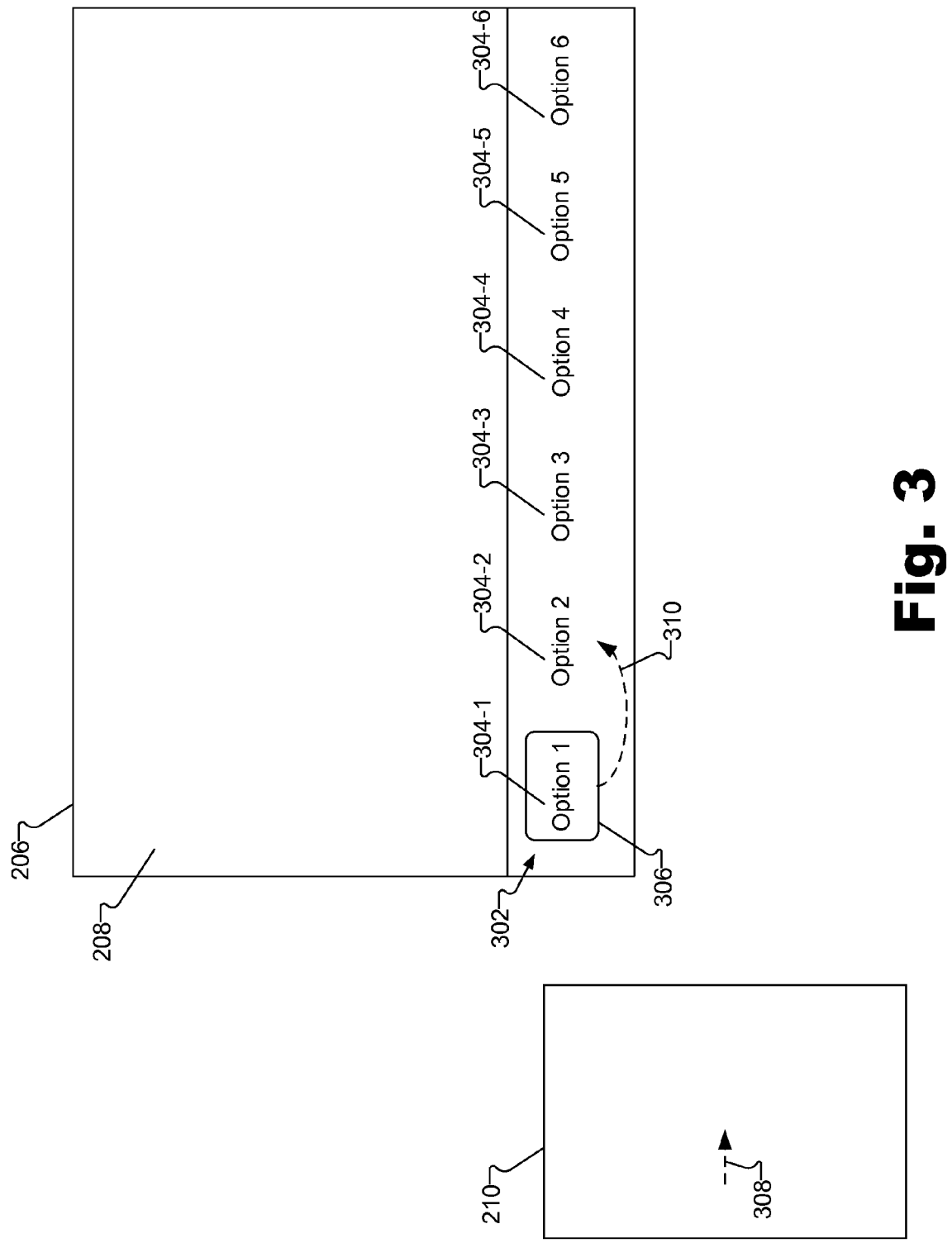

FIG. 3 depicts a view of the GUI 208 displayed on the display screen 206. As shown, the view of the GUI 208 may include a grid 302 of user selectable options 304 (e.g., selectable options 304-1 through 304-6 respectively labeled "Option 1" through "Option 6"). In the illustrated example, the grid 302 is in the form of a single row of selectable options 304, which example is illustrative only. Other arrangements of selectable options may be included in other views of the GUI 208.

As further shown, a selector object in the form of a highlighter object 306 is displayed in the view of the GUI 208 at a position to highlight selectable option 304-1. With the highlighter object 306 positioned at selectable option 304-1, a user may provide, on the touch screen 210, touch screen input configured to cause the highlighter object 306 to move to another position within view of the GUI 208 and/or the display screen 206 to highlight another selectable option in the GUI 208.

To illustrate, the user may provide touch screen input on the touch screen 210 of the remote control device 202. The touch screen input may be in the form of a gesture of a finger or other input mechanism across the surface of the touch screen 210. In FIG. 3, a dashed vector arrow 308 represents an example of such a touch screen input that includes a gesture of a finger or other input mechanism from a start point of the arrow 308 (i.e., the end of the tail of the arrow 308) across the surface of the touch screen 210 to an end point of the arrow 308 (i.e., the point of the head of the arrow 308) in a left-to-right direction on the touch screen 210.

User input facility 102 may receive touch screen input data representative of the touch screen input depicted by the arrow 308. For example, the touch screen input data may indicate one or more attributes of the touch screen input, such as a direction component and a distance component of the touch screen input. In the present example, the direction component may include a left-to-right direction across the touch screen 210. The distance component of the touch screen input may be defined in any units suitable for representing a distance of the touch screen input (e.g., relative to the touch screen 210). For example, the distance component of the touch screen input may be defined in terms of a number of pixels (e.g., a number of pixels in a row of pixels) that are traversed by the touch screen input in the direction of the touch screen input. For instance, the arrow 308 may represent a touch screen input that traverses one hundred pixels in a horizontal direction.

User input facility 102 may convert the touch screen input to GUI input associated with the displayed view of the GUI 208 in accordance with the touch-screen-based directional-hop movement mode. In certain examples, the GUI input for moving the highlighter object 306 within the GUI 208 may be defined in terms of directional hops between selectable options in the GUI 208. Accordingly, the conversion may include converting the touch screen input to directional hops.

To illustrate, for the touch screen input represented by arrow 308 in FIG. 3, user input facility 102 may map a direction component of the touch screen input to a direction in GUI input. In the illustrated example, the left-to-right direction of the touch screen input may be mapped to a left-to-right direction in the view of the GUI 208 displayed on the display screen 206. In addition, user input facility 102 may map a distance component of the touch screen input to a number of hops in the GUI input. In certain examples, user input facility 102 may base the mapping of the distance component of the touch screen input to a number of hops in the GUI input on a predefined distance-to-hops-conversion ratio. In certain examples, the distance component of the touch screen input may be defined in terms of a number of pixels of the touch screen 210, and the predefined distance-to-hops-conversion ratio may include a predefined pixel-distance-to-hops-conversion ratio.

As an example, the predefined pixel-distance-to-hops-conversion ratio may specify that a distance of one hundred pixels for a touch screen input is to be converted to one hop in the GUI input. In the illustrated example, for instance, the distance component of the touch screen input represented by arrow 308 may be one hundred pixels, and user input facility 102 may map that distance to one hop in the GUI input. Accordingly, in the illustrated example, user input facility 102 may map a left-to-right direction component and a one hundred pixel distance component of the touch screen input represented by arrow 308 to one hop in a left-to-right direction in the GUI input.

In certain examples, the predefined distance-to-hops-conversion ratio may be customizable by a user. Accordingly, the user may customize the ratio to fit preferences, physical attributes, and/or a remote control device of the user. For example, if a one-hundred-pixel-to-one-hop conversion ratio is not sufficiently reactive for the user, the user may adjust the conversion ratio to a more reactive ratio such as a fifty-pixel-to-one-hop conversion ratio.

GUI facility 104 may access and use the GUI input converted from the touch screen input by applying the GUI input to the view of the GUI 208 displayed on the display screen 206. For example, GUI facility 104 may apply to GUI data to move the highlighter object 306 away from the currently selected option 304-1 by the number of hops in the direction indicated by the GUI input to highlight a different selectable option 304 included in the GUI 208. To continue the present example, GUI facility 104 may apply the GUI data to move the highlighter object 306 away from the currently selected option 304-1 by one hop horizontally in the left-to-right direction to highlight selectable option 304-2. This particular movement of the highlighter object 306 is represented by dashed arrow 310 in FIG. 3.

In certain examples, GUI facility 104 may cause the highlighter object 306 to move in real time as the touch screen input is received and processed. Accordingly, as the user provides the touch screen input, the user may be able to view, on the display screen 206, the movement of the highlighter object 306 caused by the touch screen input in real time. In certain examples, GUI facility 104 may perform one or more operations to animate the movement of the highlighter object 306.

Figure 4:
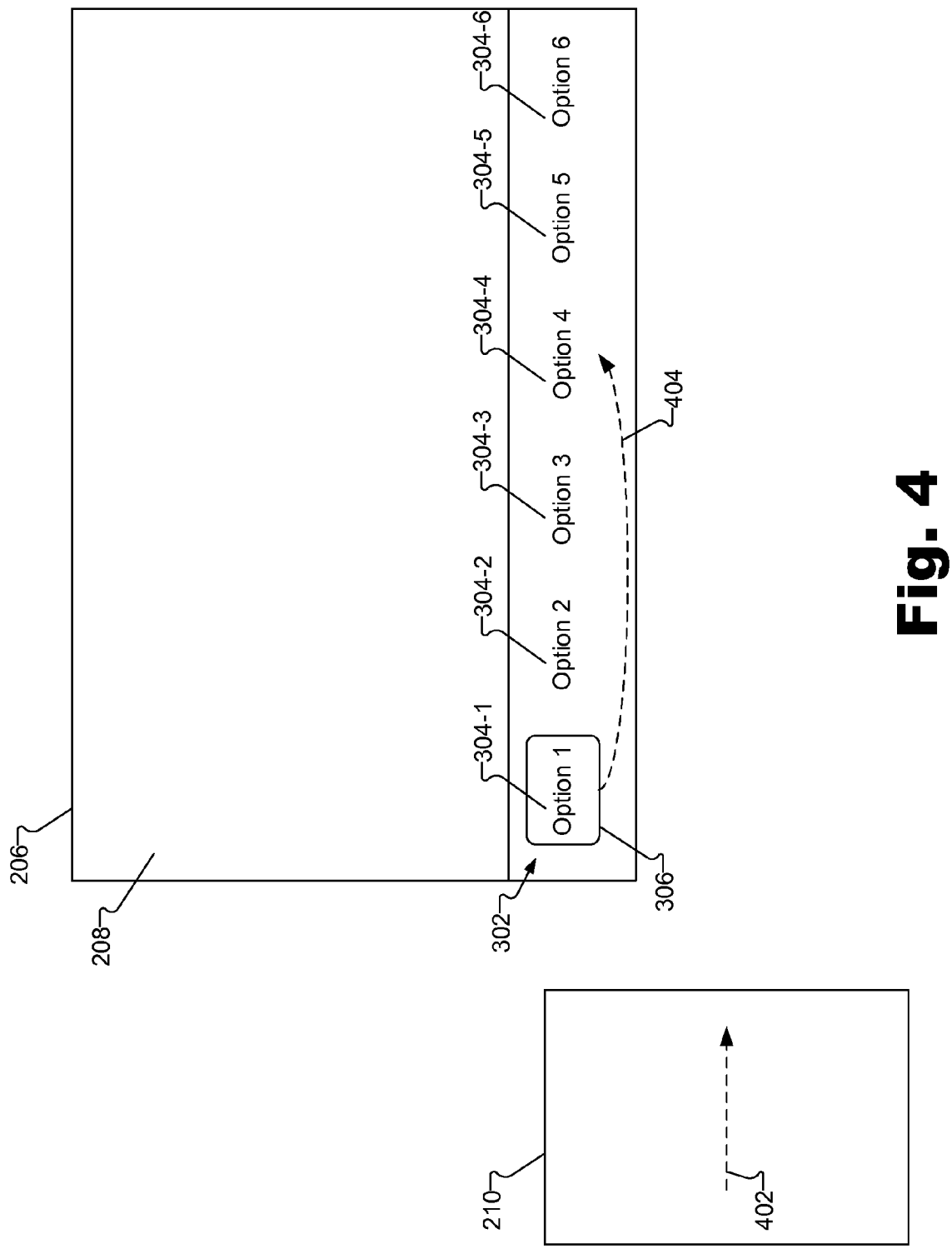

While FIG. 3 illustrates an example of a touch screen gesture converted to a single hop applied in the GUI 208, this is illustrative only. Other touch screen gestures may be converted to more hops in other examples. To illustrate, FIG. 4 depicts an example of another touch screen gesture that may be provided while the view of GUI 208 is displayed on the display screen 206. As shown, a left-to-right touch screen gesture may be provided by a user on the touch screen 210, as represented by dashed vector arrow 402. In this example, user input facility 102 may map the left-to-right direction component of the touch screen input to a left-to-right direction in the view of the GUI 208 displayed on the display screen 206. In addition, user input facility 102 may map a distance component of the touch screen input to a number of hops in the GUI input. In the illustrated example, for instance, the distance of the touch screen input represented by arrow 402 may be three hundred pixels, and user input facility 102 may map that distance to three hops in the GUI input based on a one hundred pixel-distance-to-hop-conversion ratio.

GUI facility 104 may access and use the GUI input converted from the touch screen input by applying the GUI input to the view of the GUI 208 displayed on the display screen 206. To continue the present example, GUI facility 104 may apply the GUI data to move the highlighter object 306 away from the currently selected option 304-1 by three hops horizontally in the left-to-right direction to highlight selectable option 304-4. This particular movement of the highlighter object 306 is represented by dashed arrow 404 in FIG. 4.

When applying GUI data to move the highlighter object 306, GUI facility 104 may move the highlighter object 306 hop-by-hop, from selectable object 304 to selectable object, along a hop path. For example, in the example illustrated in FIG. 4, the movement of the highlighter object 306 from selectable object 304-1 to selectable object 304-4 may follow a hop path by hopping from selectable object 304-1 to selectable object 304-2, from selectable object 304-2 to selectable object 304-3, and from selectable object 304-3 to selectable object 304-4, as represented by dashed arrows 502-1, 502-2, and 502-3, respectively, in FIG. 5.

GUI facility 104 may apply the GUI data to move the highlighter object 306 at any suitable speed. As an example, GUI facility 104 may move the highlighter object 306 along a hop path at a speed that allows the user to view the movement along the hop path, such as by viewing each hop and/or each position of the highlighter object 306 along the hop path. As another example, GUI facility 104 may move the highlighter object 306 along the hop path at a fast enough speed that each hop is not viewable by the user. Either way, when touch screen input is used as described herein, GUI facility 104 may move the highlighter object 306 along the hop path at a speed that is faster than a speed at which the highlighter object 306 may be moved along the hop path when traditional directional arrow button input is used, which faster speed may facilitate a better user experience. For example, GUI facility 104 may move the highlighter object 306 in real time as touch screen input is received, which may be at a speed that is faster than a speed at which the highlighter object 306 may be moved when traditional directional arrow button input is used, at least because the user may provide the touch screen input quicker and/or more conveniently than traditional directional arrow button input.

Figure 5:
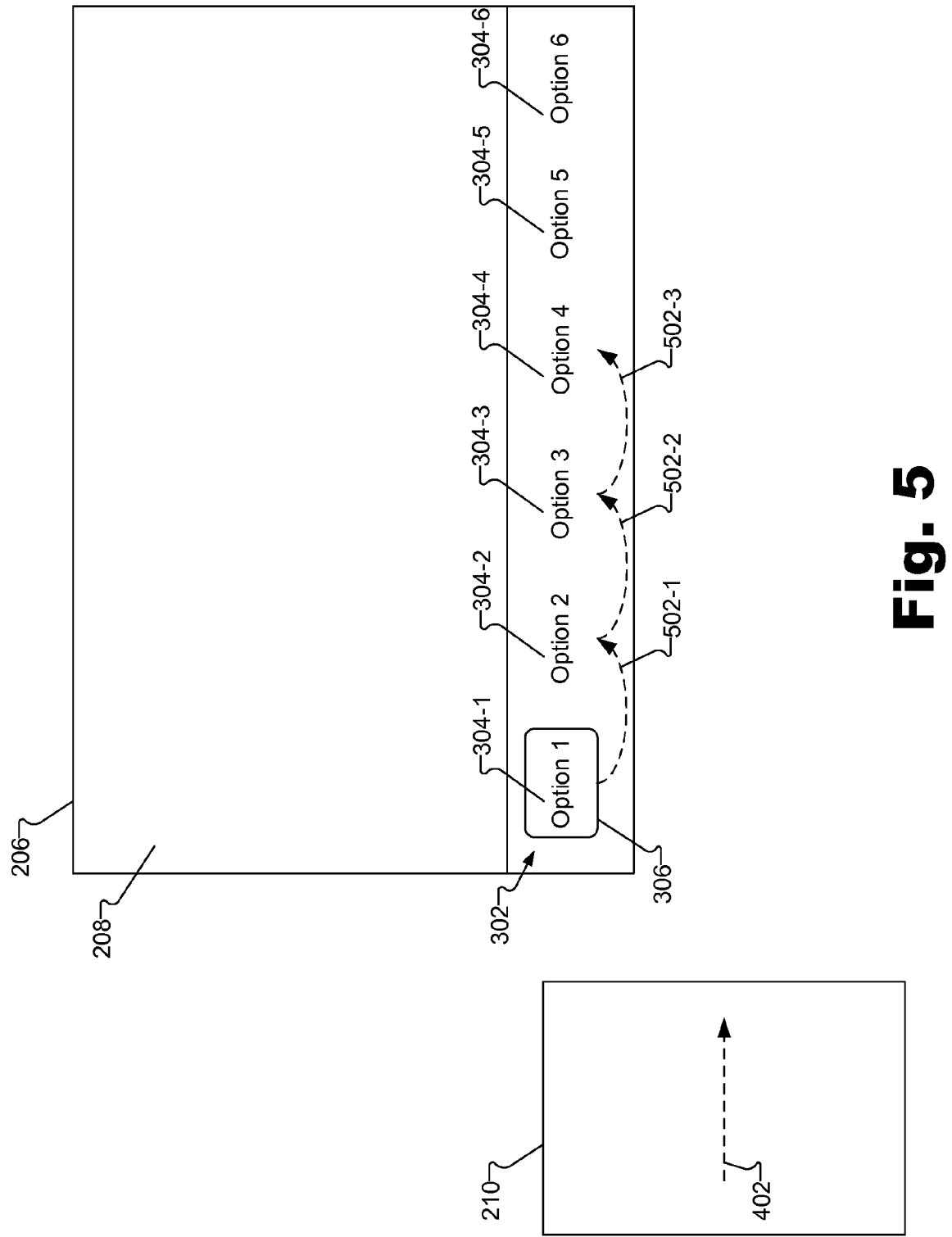

While the examples illustrated by FIGS. 3-5 are directed to touch screen input and movement of the highlighter object 306 in a horizontal direction, this is illustrative only. Touch screen gestures having various direction components (e.g., vertical, horizontal, and/or diagonal direction components) and/or combinations of direction components may be provided by the user on the touch screen 210 to cause the highlighter object 306 to move accordingly along one or more hop paths within the GUI 208.

Figure 6:
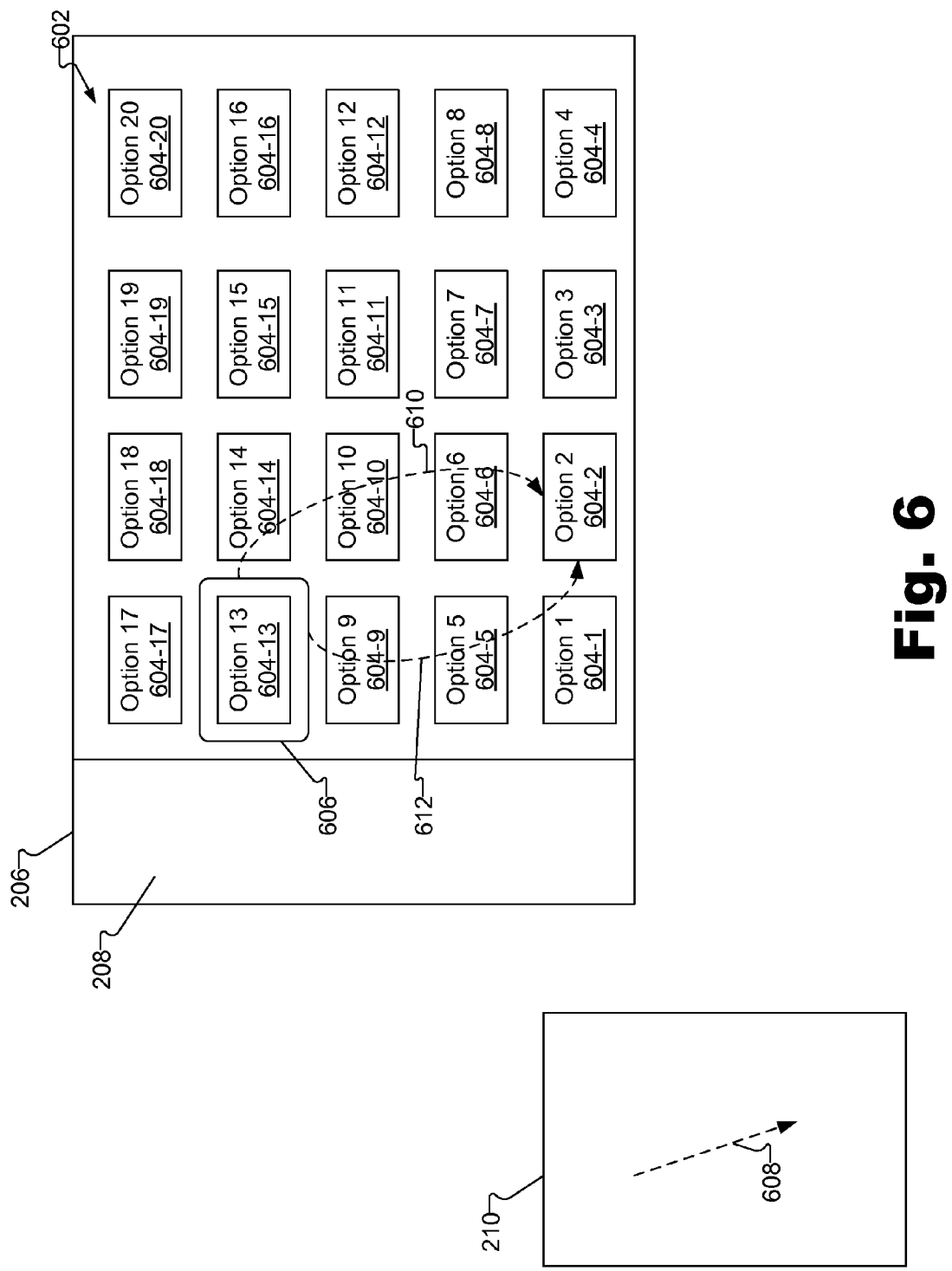

FIG. 6 depicts another view of the GUI 208 displayed on the display screen 206. As shown, the view of the GUI 208 may include a grid 602 of user selectable options 604 (e.g., selectable options 604-1 through 604-20 respectively labeled "Option 1" through "Option 20"). In the illustrated example, the grid 602 is in the form of a two-dimensional matrix grid of selectable options 604.

As further shown, a selector object in the form of a highlighter object 606 may be displayed in the view of the GUI 208 at a position to highlight selectable option 604-13. With the highlighter object 606 positioned at selectable option 604-13, a user may provide, on the touch screen 210, touch screen input configured to cause the highlighter object 606 to move to another position within the view of the GUI 208 and/or the display screen 206 to highlight another selectable option 604 in the GUI 208.

To illustrate, the user may provide touch screen input on the touch screen 210 of the remote control device 202. The touch screen input may be in the form of a gesture of a finger or other input mechanism across the surface of the touch screen 210. In FIG. 6, a dashed vector arrow 608 represents an example of such a touch screen input that includes a gesture of a finger or other input mechanism from a start point of the arrow 608 across the surface of the touch screen 210 to an end point of the arrow 608 in a diagonal left-to-right and downward direction on the touch screen 210.

User input facility 102 may receive touch screen input data representative of the touch screen input depicted by the arrow 608. For example, the touch screen input data may indicate one or more attributes of the touch screen input, such as a direction components and distance components of the touch screen input. In the present example, the direction components may include a left-to-right direction and a downward direction across the touch screen 210. The distance component of the touch screen input may be defined in any units suitable for representing a distance of the touch screen input (e.g., relative to the touch screen 210). For example, the distance component of the touch screen input may be defined in terms of a number of pixels (e.g., a number of pixels in a row of pixels) that are traversed by the touch screen input in the direction of the touch screen input. For instance, the arrow 608 may represent a touch screen input that traverses four hundred pixels in a diagonal direction. The distance may be divided into multiple distance components, including a one hundred pixel distance component for the left-to-right direction component and a three hundred pixel distance component for the downward direction component in the illustrated example.

User input facility 102 may convert the touch screen input to GUI input associated with the displayed view of the GUI 208 in accordance with the touch-screen-based directional-hop movement mode. In certain examples, the GUI input for moving the highlighter object 606 within the GUI 208 may be defined in terms of directional hops between selectable options in the GUI 208. Accordingly, the conversion may include converting the touch screen input to directional hops.

To illustrate, for the touch screen input represented by arrow 608 in FIG. 6, user input facility 102 may map a left-to-right direction component of the touch screen input to a left-to-right direction, and a downward direction component of the touch screen input to a downward direction in GUI input. In addition, for each direction component, user input facility 102 may map a distance component of the touch screen input to a number of hops in the GUI input based on a predefined distance-to-hops-conversion ratio, as described herein. In the illustrated example, for instance, a first distance component of the touch screen input represented by arrow 608 may be one hundred pixels in the left-to-right direction, and user input facility 102 may map that distance to one hop in the left-to-right direction in the GUI input. In addition, a second distance component of the touch screen input represented by arrow 608 may be three hundred pixels in the downward direction, and user input facility 102 may map that distance to three hops in the downward direction in the GUI input.

GUI facility 104 may access and use the GUI input converted from the touch screen input by applying the GUI input to the view of the GUI 208 displayed on the display screen 206. For example, GUI facility 104 may apply GUI data to move the highlighter object 606 away from the currently selected option 604-13 by the number of hops in each direction indicated by the GUI input to highlight a different selectable option 604 included in the GUI 208. To continue the present example, GUI facility 104 may apply the GUI data to move the highlighter object 606 away from the currently selected option 604-13 by one hop horizontally in the left-to-right direction and three hops in the downward direction to highlight selectable option 604-2. This particular movement of the highlighter object 606 is represented by dashed arrow 610 in FIG. 6. A hop path for this movement may include movement of the highlighter object 606 from option 604-13 to option 604-14, from option 604-14 to option 604-10, from option 604-10 to option 604-6, and from option 604-6 to option 604-2, as represented by the path of arrow 610.

Alternatively, GUI facility 104 may apply GUI input in the downward direction first followed by GUI input in the left-to-right direction. For example, GUI facility 104 may apply the GUI data to move the highlighter object 606 away from the currently selected option 604-13 by three hops in the downward direction and one hop horizontally in the left-to-right direction to highlight selectable option 604-2. This particular movement of the highlighter object 606 is represented by dashed arrow 612 in FIG. 6. A hop path for this movement may include movement of the highlighter object 606 from option 604-13 to option 604-9, from option 604-9 to option 604-5, from option 604-5 to option 604-1, and from option 604-1 to option 604-2, as represented by the path of arrow 612.

For a true diagonal touch input, such as is represented by arrow 608 in FIG. 6, GUI facility 104 may select whether to apply the horizontal distance component or the vertical distance component of the touch input first when moving the highlighter object 606 along a hop path. More commonly, generally diagonal touch input may be biased in either the horizontal or vertical direction at the start of the touch input, in which case, GUI facility 104 may first apply the distance component that matches the bias. For example, if the touch input begins with a vertical directional bias, GUI facility 104 may apply the vertical hops of the GUI input first followed by the horizontal hops of the GUI input.

While FIGS. 3-6 illustrate examples of horizontal and diagonal vector touch screen inputs, touch screen inputs may more commonly vary from true horizontal, vertical, and diagonal vectors. User input facility 102 may be configured to receive and convert such natural touch gesture input to GUI input in the form of a set of one or more horizontal and/or vertical hops. GUI facility 104 may apply the hops in the set of one or more horizontal and/or vertical hops over time, such as in real time as the natural touch gesture input is received. For example, GUI facility 104 may apply a number of hops in one direction as converted from a first touch input that is part of a touch gesture and then apply a number of hops in another direction or the same direction as converted from a second touch input that is part of the same or a different touch gesture that temporally follows the first touch input.

FIG. 7 depicts another view of the GUI 208 displayed on the display screen 206. As shown, the view of the GUI 208 may include a grid 702 of user selectable options 704 (e.g., selectable options 704-1 through 704-20 respectively labeled "Option 1" through "Option 20"). In the illustrated example, the grid 702 is in the form of a two-dimensional matrix grid of selectable options 704.

As further shown, a selector object in the form of a highlighter object 706 may be displayed in the view of the GUI 208 at a position to highlight selectable option 704-13. With the highlighter object 706 positioned at selectable option 704-13, a user may provide, on the touch screen 210, touch screen input configured to cause the highlighter object 706 to move to another position within view of the GUI 208 and/or the display screen 206 to highlight another selectable option 704 in the GUI 208.

To illustrate, the user may provide touch screen input on the touch screen 210 of the remote control device 202. The touch screen input may be in the form of a gesture of a finger or other input mechanism across the surface of the touch screen 210. In FIG. 7, a dashed arrow 708 represents an example of such a touch screen input that includes a natural gesture of a finger or other input mechanism from a start point of the arrow 708 across the surface of the touch screen 210 to an end point of the arrow 708 on the touch screen 210.

User input facility 102 may receive touch screen input data representative of the touch gesture depicted by the arrow 708. For example, the touch screen input data may indicate one or more attributes of the touch gesture, such as direction components and distance components of the touch gesture. In the present example, the direction components may include a left-to-right direction and a downward direction across the touch screen 210. The distance components of the touch screen input may be defined in any units suitable for representing a distance of the touch screen input (e.g., relative to the touch screen 210). For example, the distance components of the touch screen input may be defined in terms of number of pixels that are traversed by the touch screen input in the direction of the touch screen input. For instance, the arrow 708 may represent a touch screen input that traverses two hundred twenty five pixels in a left-to-right horizontal direction and three hundred thirty pixels in a downward direction.

User input facility 102 may convert the touch screen input to GUI input associated with the displayed view of the GUI 208 in accordance with the touch-screen-based directional-hop movement mode. In certain examples, the GUI input for moving the highlighter object 706 within the GUI 208 may be defined in terms of directional hops between selectable options in the GUI 208. Accordingly, the conversion may include converting the touch screen input to directional hops.

To illustrate, for the touch screen input represented by arrow 708 in FIG. 7, user input facility 102 may map a left-to-right direction component of the touch screen input to a left-to-right direction, and a downward direction component of the touch screen input to a downward direction in GUI input. In addition, for each direction component, user input facility 102 may map a distance component of the touch screen input to a number of hops in the GUI input based on a predefined distance-to-hops-conversion ratio, as described herein. In the illustrated example, for instance, a first distance component of the touch screen input represented by arrow 708 may be two hundred twenty five pixels in the left-to-right direction, and user input facility 102 may map that distance to two hops in the left-to-right direction in the GUI input. In addition, a second distance component of the touch screen input represented by arrow 708 may be three hundred thirty pixels in the downward direction, and user input facility 102 may map that distance to three hops in the downward direction in the GUI input.

GUI facility 104 may access and use the GUI input converted from the touch screen input by applying the GUI input to the view of the GUI 208 displayed on the display screen 206. For example, GUI facility 104 may apply GUI data to move the highlighter object 706 away from the currently selected option 704-13 by the number of hops in each direction indicated by the GUI input to highlight a different selectable option 704 included in the GUI 208. To continue the present example, GUI facility 104 may apply the GUI data to move the highlighter object 706 away from the currently selected option 704-13 by two hops horizontally in the left-to-right direction and three hops in the downward direction to highlight selectable option 704-3. This particular movement of the highlighter object 706 is represented by dashed arrow 710 in FIG. 7. A hop path for this movement may include movement of the highlighter object 706 from option 704-13 to option 704-14, from option 704-14 to option 704-15, from option 704-15 to option 704-11, from option 704-11 to option 704-7, and from option 704-7 to option 704-3, as represented by the path of arrow 710.

In converting pixel distance to a number of hops, user input facility 102 may implement one or more number rounding and/or distance threshold ranges. As an example, for a predefined pixel-distance-to-directional-hop ratio of one hundred pixels to one hop, user input facility 102 may be configured to map any number of pixels within a certain range of one hundred pixels to one hop (e.g., a range of one hundred pixels to one hundred ninety nine pixels (100-199 pixels)). User input facility 102 may similarly utilize any other suitable distance threshold range and/or number rounding to convert pixels to hops in other examples.

In certain examples, in addition or alternative to operating in accordance with a touch-screen-based directional-hop movement mode, system 100 may operate in a touch-screen-based free-cursor directional movement mode ("free-cursor directional movement mode"). In this mode, GUI facility 104 may be configured to move a selector object within the plane of a displayed view of the GUI 208 and/or the display screen 206 in a free-form manner based on touch screen input, with user input facility 102 converting the touch screen input to GUI input in a manner that supports free-form movement of the selector object on the display screen 206.

To this end, in certain examples, user input facility 102 may define an active area of the touch screen 210 to map to the display screen 206. The definition and the mapping may be performed in any way suitable to facilitate mapping of locations on the touch screen 210 to locations on the display screen 206. For example, user input facility 102 may map the defined active area of the touch screen 210 to the display screen 206 at a one-to-one ratio, and use percentages of the active area of the touch screen 210 and the display screen 206 to map locations on the touch screen 210 to locations on the display screen 206. This may allow user input facility 102 to map locations on touch screens having various attributes (e.g., various screen sizes, orientations, and/or resolutions) to the display screen 206.

Figure 8:
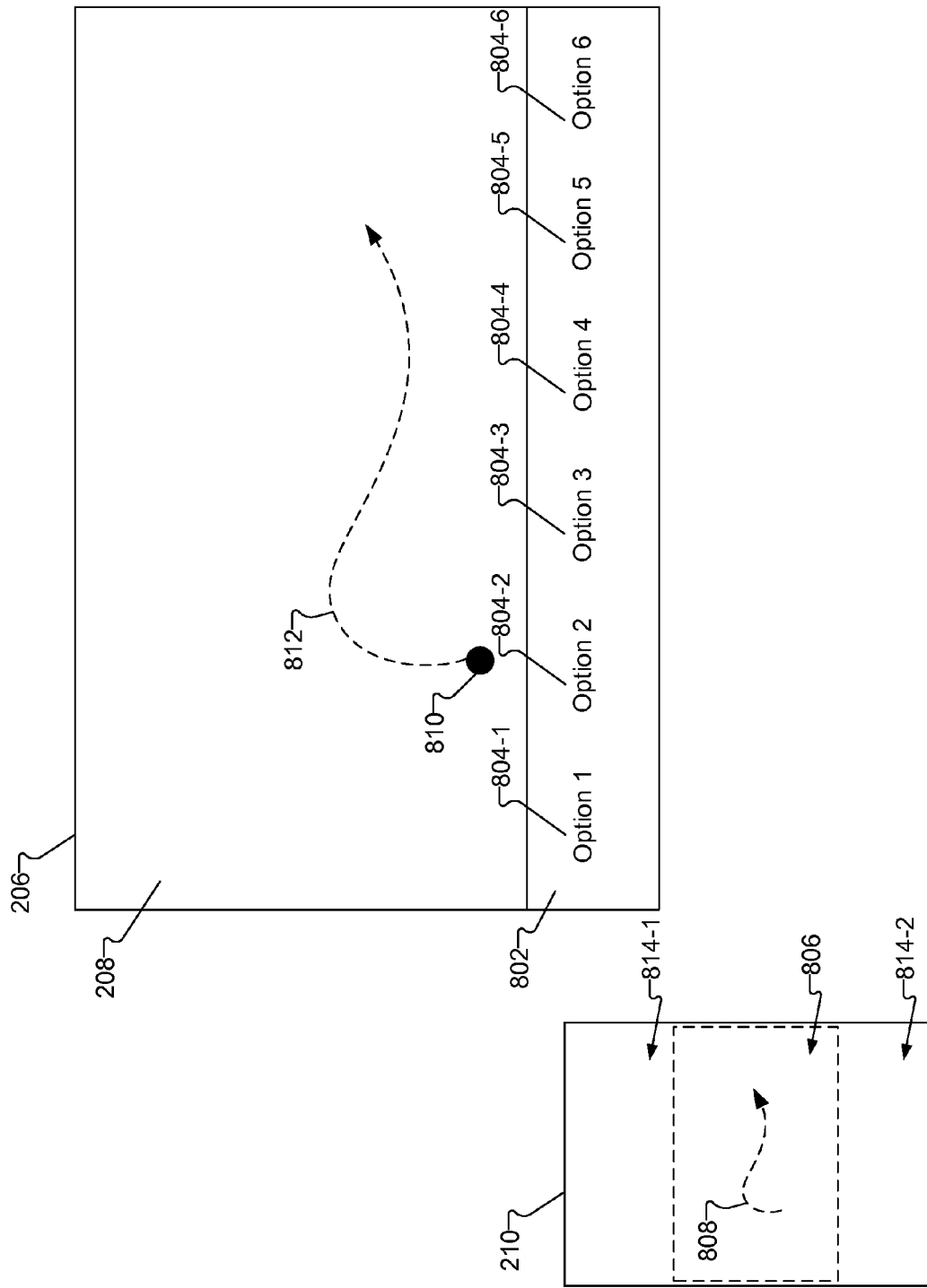

To illustrate, FIG. 8 depicts a view of the GUI 208 displayed on the display screen 206. As shown, the view of the GUI 208 may include a grid 802 of user selectable options 804 (e.g., selectable options 804-1 through 804-6 respectively labeled "Option 1" through "Option 6"). In the illustrated example, the grid 802 is in the form of a single row of selectable options 804.

As further shown, user input facility 102 may define an active area 806 of the touch screen 210, represented as the area inside of the dashed-line box shown in FIG. 8. User input facility 102 may map the active area 806 of the touch screen 210 to the display screen 206 such that touch screen input provided by a user within the active area 806 may be mapped to on-screen locations within the display screen 206.

To illustrate, the user may provide touch screen input within the active area 806 of the touch screen 210 of the remote control device 202. The touch screen input may be in the form of a gesture of a finger or other input mechanism across the surface of the touch screen 210. In FIG. 8, a dashed arrow 808 represents an example of such a touch screen input that includes a gesture of a finger or other input mechanism from a start point of the arrow 808 across the surface of the touch screen 210 to an end point of the arrow 808 in a natural, free-form manner.

User input facility 102 may receive touch screen input data representative of the touch screen input depicted by the arrow 808. The touch screen input data may indicate one or more attributes of the touch screen input, such as location components (e.g., screen coordinates) and time components (e.g., timestamps) of the touch screen input.

User input facility 102 may convert the touch screen input to GUI input associated with the displayed view of the GUI 208 and/or the display screen 206 in accordance with the free-cursor directional movement mode. In certain examples, the GUI input may be defined in terms of screen coordinates associated with the display screen 206. Accordingly, the conversion may include mapping screen coordinates associated with the touch screen 210 to screen coordinates associated with the display screen 206.

In certain examples, user input facility 102 may use percentages of screen locations to map touch screen locations to display screen locations. To illustrate, for the example shown in FIG. 8, user input facility 102 may map the screen coordinates for the location of the start point of the touch gesture represented by the arrow 808 to percentages relative to the active area 806 of the touch screen 210. For example, the bottom left corner of the active area 806 may be defined as an origin point for the active area 806, and a location of a touch input within the active area 806 may be defined in terms of a combination of a horizontal percentage distance specifying a horizontal percentage distance from the origin point at the left side of the active area 806 to the right side of the active area 806 and a vertical percentage distance specifying a vertical percentage distance from the origin point at the bottom of the active area 806 to the top of the active area 806. Based on such definitions, user input facility 102 may determine the start point of the touch gesture represented by the arrow 808 to be located a certain horizontal distance percentage between the left side and the right side of the active area 806 and a certain vertical distance percentage between the bottom and the top of the active area 806. For example, user input facility 102 may determine the start point of the touch gesture represented by the arrow 808 to be twenty-nine percent (29%) of the way between the left side and the right side of the active area 806 and thirty-four percent (34%) of the way between the bottom and the top of the active area 806.

User input facility 102 may then apply the percentage distance components to the display screen 206. For example, user input facility 102 may determine screen coordinates of the display screen 206 that are twenty-nine percent (29%) of the way between the left side and the right side of the display screen 206 and thirty-four percent (34%) of the way between the bottom and the top of the display screen 206. In this manner, user input facility 102 may convert touch input at the location of the start of the touch gesture represented by the arrow 808 to GUI data having a location on the display screen 206.

In certain examples, the determined location on the display screen 208 may be visually indicated on the display screen 206 for viewing by a user of the remote control device 202, which may help the user to effectively interact with the GUI 208 when the free-cursor directional movement mode is active. In FIG. 8, the determined location on the display screen 208 is visually indicated by a dot indicator 810 displayed at the determined location on the display screen 208.

As the user acts out the touch gesture represented by the arrow 808 on the touch screen 210, GUI facility 104 may provide, in real time, the dot indicator 810 for display along a path 812 that corresponds to and is mapped from the touch gesture. Accordingly, as the user provides touch input on the surface of the touch screen 210, GUI facility 104 may provide the dot indicator 810 for display at corresponding locations on the display screen 206. This visual feedback may help the user to provide touch input that produces a desired free-form cursor movement in GUI 208.

In certain examples, the active area 806 may cover only a subset of the area of the touch screen 210, and the touch screen 210 may consequently include one or more other areas not included in the active area 806. Such areas may be mapped to areas within the plane of the display screen 206 but outside the viewing area of the display screen 206 and may be referred to as "inactive areas." For example, in FIG. 8, user input facility 102 has defined the touch screen 210 to include the active area 806 and two inactive areas 814-1 and 814-2 covering areas above and below the active area 806, respectively. System 100 may be configured to map touch input provided in an inactive area of the touch screen 210 to one or more operations of the GUI 208 and/or the electronic device 204.

As an example, user input facility 102 may receive touch screen input data representative of the touch screen input having a touch screen location within inactive area 814-1. The touch screen input data may indicate one or more attributes of the touch screen input, such as location components (e.g., screen coordinates) and time components (e.g., timestamps) of the touch screen input.

User input facility 102 may convert the touch screen input to GUI input associated with the displayed view of the GUI 208 and/or the display screen 206 in accordance with the free-cursor directional movement mode, such as described herein. This may include mapping a location of the touch screen input on the touch screen 210 to a location relative to the display screen 206 as described herein. When the touch screen input has a location in an inactive area 814-1 of the touch screen 210, user input facility 102 may map the touch screen input GUI data that includes a location that is off-screen (e.g., above) of the viewing area of the display screen 206.

GUI facility 104 may apply the GUI data to the GUI 208, which may include determining that the location of the GUI data is located off-screen of the viewing area of the display screen 206 and, in response, performing a specific operation pre-associated with GUI data located off-screen of the viewing area of the display screen 206. The operation may be pre-associated to off-screen GUI data generally or to off-screen GUI data having a specific location. For example, a first operation may be pre-associated to GUI data having a location above the viewing area of the display screen 206 (e.g., a location mapped from touch screen input located in inactive area 814-1 of the touch screen 210) and a second operation may be pre-associated to GUI data having a location below the viewing area of the display screen 206 (e.g., a location mapped from touch screen input located in inactive area 814-2 of the touch screen 210).

Figure 9:
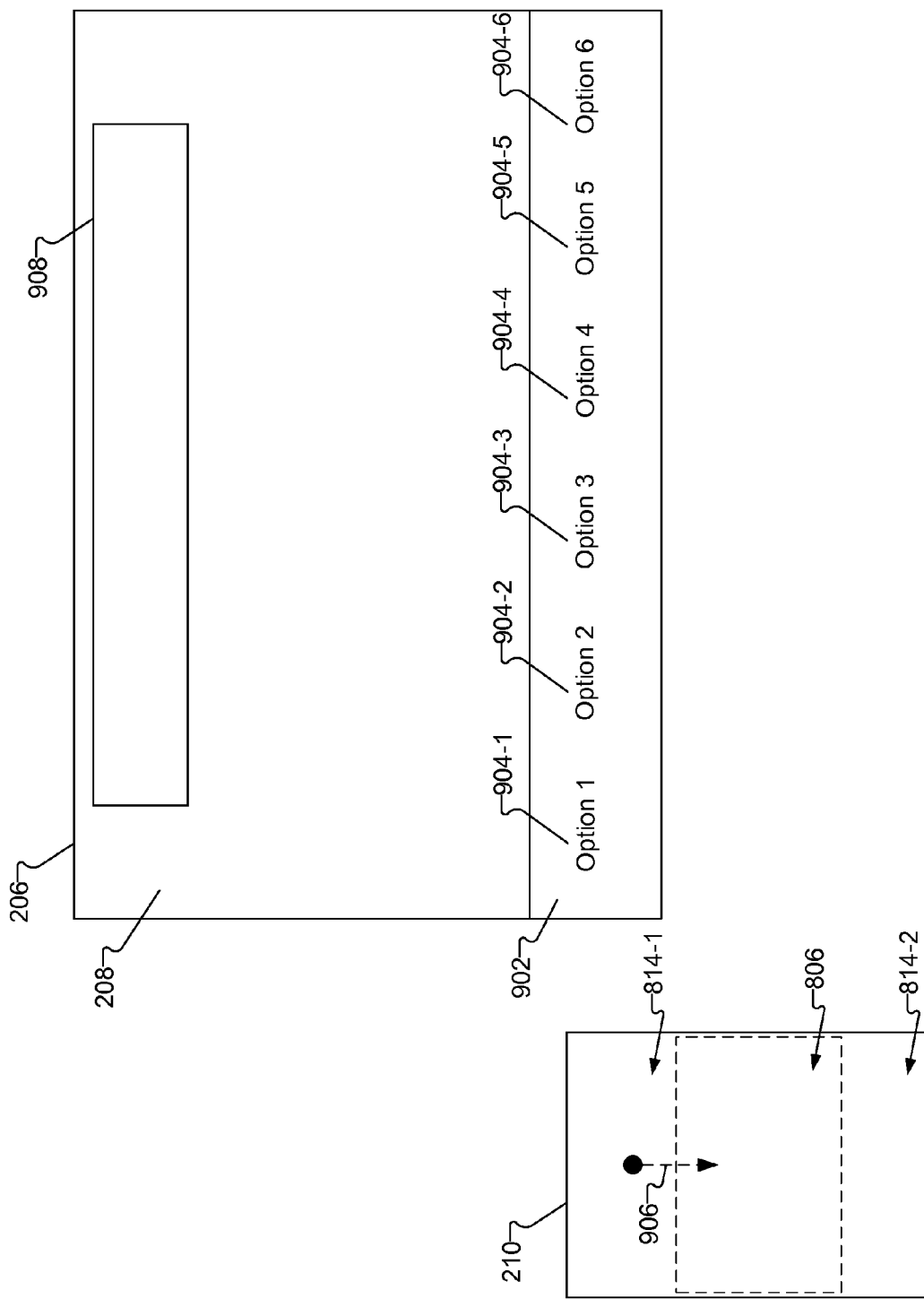

To illustrate, FIG. 9 depicts a view of the GUI 208 displayed on the display screen 206. As shown, the view of the GUI 208 may include a grid 902 of user selectable options 904 (e.g., selectable options 904-1 through 904-6 respectively labeled "Option 1" through "Option 6"). In the illustrated example, the grid 902 is in the form of a single row of selectable options 904.

A user may provide touch screen input on the touch screen 210 of the remote control device 202. The touch screen input may be in the form of a gesture of a finger or other input mechanism that begins in the inactive area 814-1 of the touch screen 210 and moves across the surface of the touch screen 210 into the active area 806 of the touch screen 210, as represented by dashed arrow 906.

User input facility 102 may receive touch screen input data representative of the touch screen input and convert the touch screen data to GUI data. GUI facility 104 may apply the GUI data to the GUI 208, which may include determining that the GUI data is associated with a location off-screen of the viewing area of the display screen 206 and, in response, performing an operation pre-associated with the off-screen location of the GUI data. For example, GUI facility 104 may provide a display window 908, such as an informational or menu window, for display in the view of the GUI 208 as shown in FIG. 9. In this or a similar manner, system 100 may perform an operation in response to a user providing touch screen input that is mapped to an off-screen location relative to the display screen 206.

Accordingly, when GUI facility 104 applies GUI data to the GUI 208, GUI facility 104 may determine whether the GUI data 104 has an off-screen location component. If GUI facility 104 determines that the GUI data does have an off-screen location component, GUI facility 104 may perform one or more operations pre-associated with GUI input having the off-screen location component. If, on the other hand, GUI facility 104 determines that the GUI data does not have an off-screen location component (e.g., a location of the GUI data is on-screen within the viewing area of the display screen 206), GUI facility 104 may perform one or more operations based on an on-screen location of the GUI data, such as providing a visual indication (e.g., dot indicator 810) of the on-screen location in the view of the GUI 208 displayed on the display screen 206.

As mentioned, system 100 may be configured to map touch screen inputs to operations of the GUI 208 and/or the electronic device 204 in accordance with an active touch-screen-based input mode. System 100 may be configured to switch from operating in accordance with one mode to operating in accordance with another mode. Such a switch may include system 100 deactivating a currently active touch-screen-based input mode (e.g., a first touch-screen-based directional movement mode) and activating a different touch-screen-based input mode (e.g., a second touch-screen-based directional movement mode) in response to an occurrence of any predefined event, such as in response to user input requesting that a touch-screen-based input mode be made active, a providing of a particular view of the GUI 208 (e.g., an electronic program guide view, a media-on-demand content browse view, etc.), a login of a particular user, a receipt of touch screen input from a particular remote control device or type of remote control device, and/or any other predefined event.

In certain examples, system 100 may associate a first mode with a first view of the GUI 208 and a second mode with a second view of the GUI 208. When the first view of the GUI 208 is provided for display, system 100 may automatically activate the first mode. When the second view of the GUI 208 is provided for display, system 100 may automatically activate the second mode. As an example, when a video playback view of the GUI 208 is displayed, system 100 may operate in accordance with the free-cursor directional movement mode as described herein, and when an electronic program guide view of the GUI 208 is displayed, system 100 may operate in accordance with the directional-hop movement mode as described herein.

System 100 may combine the movement of a selector object on the display screen 206 in accordance with a directional movement mode with one or more predefined touch screen inputs. For example, any of the exemplary touch inputs, such as a single-tap input, a double-tap input, a triple-tap input, a press-and-hold input, and a fast swipe input (e.g., a swipe having at least a minimum speed or acceleration), may be pre-associated with certain operations that may be used to navigate the GUI 208 in combination with touch inputs that cause a selector object to move on the display screen 206.

As an example, system 100 may move a selector object within an electronic program guide view of the GUI 208 in response to touch screen input and in accordance with a directional movement mode, such as described herein. In addition, a user may provide a fast swipe touch input to cause a page scroll GUI operation (e.g., a page-up or page-down operation) to be performed.

Figure 10:
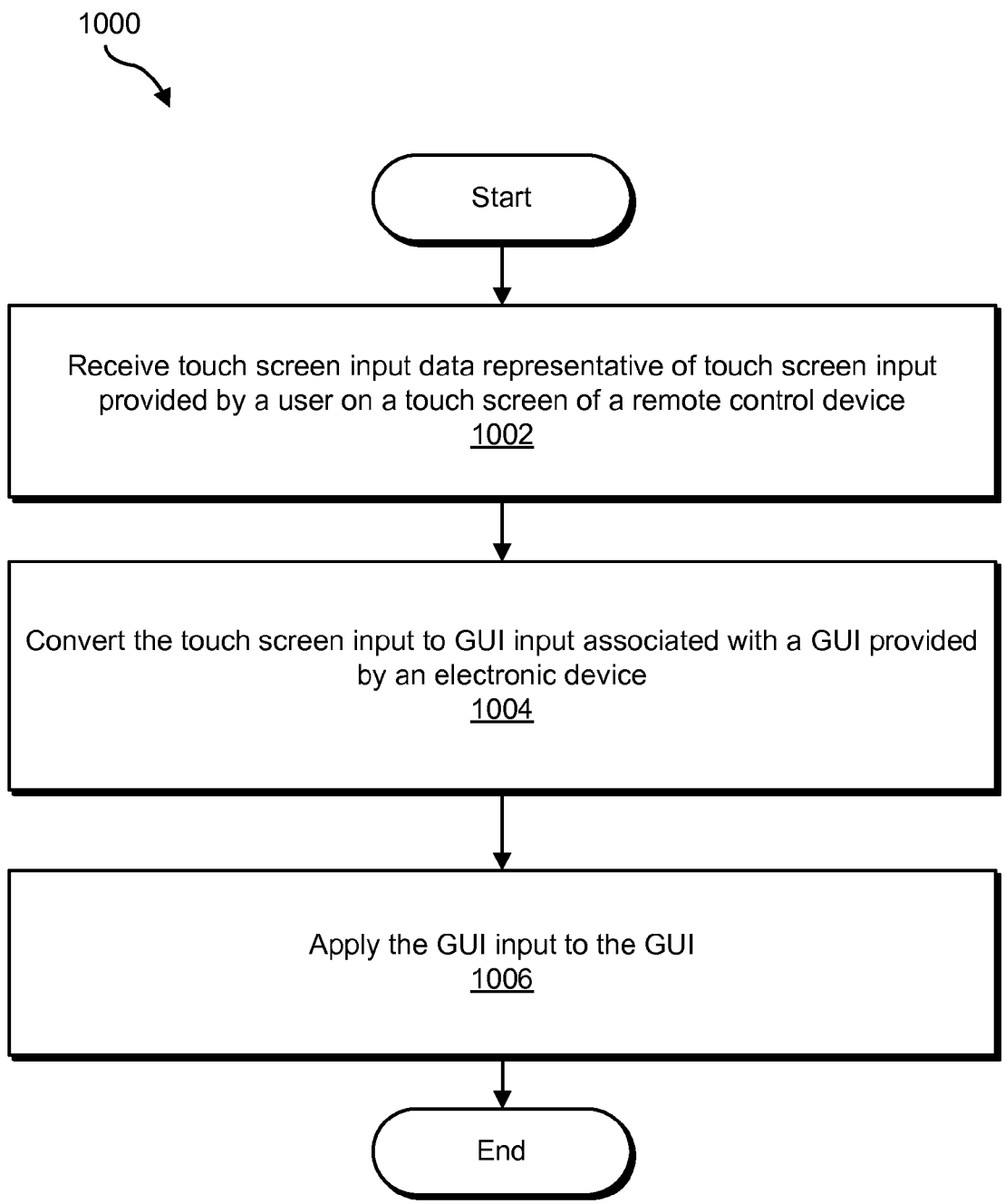
FIG. 10 illustrates an exemplary method of touch-screen-based remote interaction with a graphical user interface according to principles described herein.

FIG. 10 illustrates an exemplary method 1000 of touch-screen-based remote interaction with a GUI according to principles described herein. While FIG. 10 illustrates exemplary steps according to certain embodiments, other embodiments may omit, add to, reorder, combine, and/or modify any of the steps shown in FIG. 10. In certain embodiments, one or more of the steps shown in FIG. 10 may be performed by system 100 and/or one or more components or implementations of system 100, such as by a computing device (e.g., electronic device 204) implementing system 100.

In step 1002, a user interface system (e.g., system 100) receives touch screen input data representative of touch screen input provided by a user on a touch screen of a remote control device. Step 1002 may be performed in any of the ways described herein and may include receiving data representative of suitable touch screen input, including any of the examples of touch screen input described herein.

In step 1004, the user interface system converts the touch screen input to GUI input associated with a GUI provided by an electronic device (e.g., an electronic device communicatively coupled to the remote control device by way of wireless signaling). Step 1004 may be performed in any of the ways and/or in accordance with any of the exemplary touch-screen-based input modes described herein.

As an example, the user interface system may convert the touch screen input to GUI input in the form of directional hops in accordance with a directional-hop movement mode. As another example, the user interface system may convert a location of the touch screen input on a touch screen to a location on a display screen on which the GUI is displayed in accordance with a free-cursor directional movement mode.

In step 1006, the user interface system applies the GUI input to the GUI. Step 1006 may be performed in any of the ways described herein, and may include performing any of the exemplary GUI operations described herein and/or other GUI operations pre-associated with the GUI input. For example, the user interface system may move a selector object within a displayed view of the GUI by directional hops or free-form cursor movement, such as described herein.

Method 1000, or one or more steps of method 1000, may be repeated for additional touch screen input. For example, method 1000 may be repeated over time as touch screen inputs of a touch gesture on a touch screen are received by the user interface system 100.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 11:
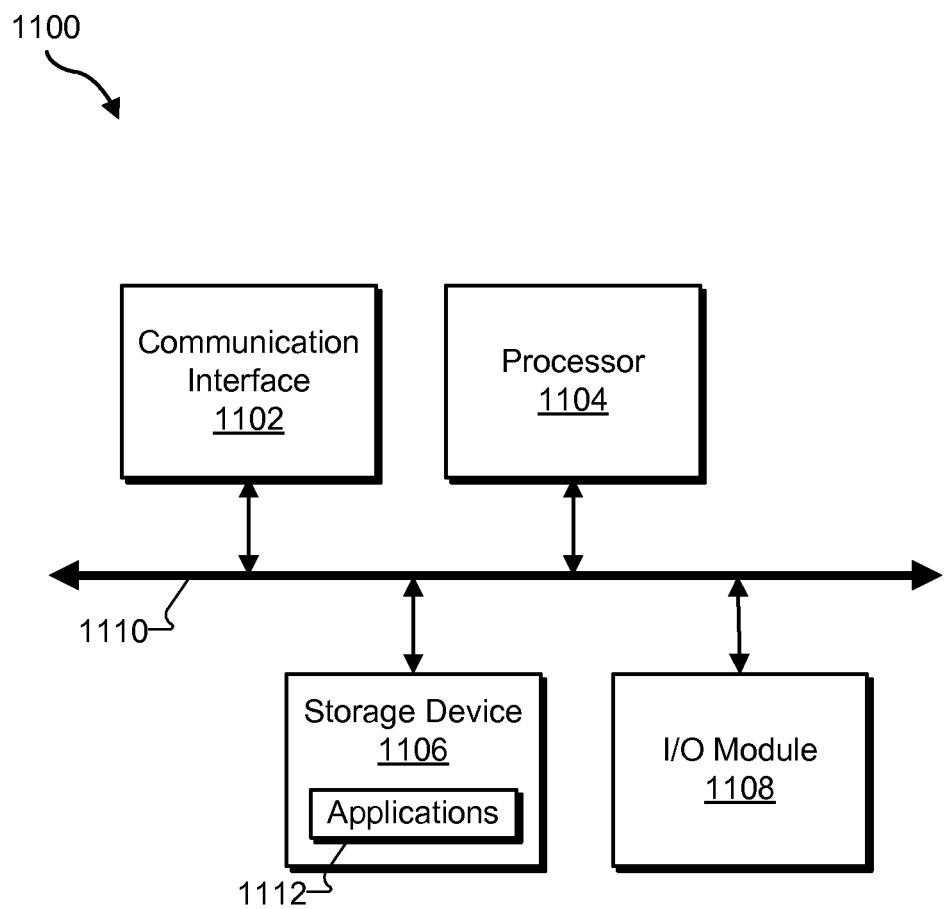
FIG. 11 illustrates an exemplary computing device according to principles described herein.

FIG. 11 illustrates an exemplary computing device 1100 that may be configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a communications medium interface, a modem, and any other suitable interface. Communication interface 1102 may be configured to interface with any suitable communication media, protocols, and formats, including any of those mentioned above.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1106. For example, data representative of one or more executable applications 1112 (which may include, but are not limited to, one or more of the software applications configured to direct processor 1104 to perform any of the operations described herein may be stored within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with user input facility 102 and/or GUI facility 104. Likewise, storage facility 106 may be implemented by or within storage device 1106. In such implementations, system 100 may be referred to as a computer-implemented system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

activating, one at a time by a computer-implemented user interface system, a touch-screen-based directional-hop movement mode and a touch-screen-based free-cursor directional movement mode; and while the touch-screen-based directional-hop movement mode is active:

receiving, by the computer-implemented user interface system, touch screen input data representative of a touch screen input provided by a user on a touch screen of a remote control device configured to communicate wirelessly with an electronic device that provides a graphical user interface ("GUI") having a grid of user selectable options for display on a display screen, the touch screen input having a distance component and a direction component;

converting, by the computer-implemented user interface system, the touch screen input to a GUI input associated with the GUI displayed on the display screen, the converting including mapping the distance component and the direction component to a number of hops and a direction; and applying, by the computer-implemented user interface system, the GUI input to the GUI displayed on the display screen by moving a highlighter object persistently positioned within the GUI and on one user selectable option within the grid of user selectable options at a time away from a currently highlighted user selectable option in the grid of user selectable options by the number of hops in the direction to highlight a different user selectable option in the grid of user selectable options in the GUI; and while the touch-screen-based free-cursor directional movement mode is active:

receiving, by the computer-implemented user interface system, additional touch screen input data representative of an additional touch screen input provided by the user on the touch screen of the remote control device;

converting, by the computer-implemented user interface system, the additional touch screen input to an additional GUI input associated with the GUI provided by the electronic device for display on the display screen, the converting comprising mapping a touch screen location of the additional touch screen input to a display screen location; and applying, by the computer-implemented user interface system, the additional GUI input to the GUI displayed on the display screen, the applying comprising determining that the display screen location is an off-screen location outside of the display screen and performing a predefined GUI operation associated with the off-screen location.

2. The method of claim 1, wherein the mapping of the distance component and the direction component to the number of hops and the direction is based on a predefined distance-to-hops-conversion ratio.

3. The method of claim 2, wherein:

the distance component specifies a number of pixels of the touch screen; and the predefined distance-to-hops-conversion ratio comprises a predefined pixel-distance-to-hops-conversion ratio.

4. The method of claim 2, wherein the predefined distance-to-hops-conversion ratio is customizable by the user.

5. The method of claim 1, wherein the GUI is part of a media service user interface of a media service.

6. The method of claim 5, wherein the GUI comprises at least one of an electronic program guide for scheduled television programming, a media-on-demand content browse interface, a media content playback interface, and a media service menu interface for the media service.

7. The method of claim 5, wherein:

the electronic device comprises a set-top box device configured to facilitate user access to the media service; and the remote control device runs an installed application that configures the remote control device to remotely control the set-top box device.

8. The method of claim 1, wherein the computer-implemented user interface system is implemented entirely by the electronic device.

9. The method of claim 1, wherein the touch screen input is at least part of a touch gesture provided by the user across a surface of the touch screen.

10. The method of claim 1, further comprising:

receiving, by the computer-implemented user interface system, directional-pad input data representative of a user actuation of a directional arrow button of a directional pad of another remote control device configured to communicate wirelessly with the electronic device; and applying, by the computer-implemented user interface system, the user actuation of the directional arrow to the GUI displayed on the display screen by moving the highlighter object one hop in a direction of the directional arrow button within the grid of user selectable options in the GUI.

11. The method of claim 1, embodied as computer-executable instructions on at least one non-transitory computer-readable medium.

12. A system comprising:

at least one physical computing device that activates, one at a time, a touch-screen-based directional-hop movement mode and a touch-screen-based free-cursor directional movement mode; and while the touch-screen-based directional-hop movement mode is active:

receives touch screen input data representative of a touch screen input provided by a user on a touch screen of a remote control device configured to communicate wirelessly with an electronic device that provides a graphical user interface ("GUI") having a grid of user selectable options for display on a display screen, the touch screen input having a distance component and a direction component;

converts the touch screen input to a GUI input associated with the GUI displayed on the display screen by mapping the distance component and the direction component to a number of hops and a direction; and applies the GUI input to the GUI displayed on the display screen by moving a highlighter object persistently positioned within the GUI and on one user selectable option within the grid of user selectable options at a time away from a currently highlighted user selectable option in the grid of user selectable options by the number of hops in the direction to highlight a different user selectable option in the grid of user selectable options in the GUI; and while the touch-screen-based free-cursor directional movement mode is active:
receives additional touch screen input data representative of an additional touch screen input provided by the user on the touch screen of the remote control device;
converts the additional touch screen input to an additional GUI input associated with the GUI provided by the electronic device for display on the display screen, the converting comprising mapping a touch screen location of the additional touch screen input to a display screen location; and
applies the additional GUI input to the GUI displayed on the display screen by determining that the display screen location is an off-screen location outside of the display screen and performing a predefined GUI operation associated with the off-screen location.

13. The system of claim 12, wherein:
the distance component specifies a number of pixels of the touch screen in a direction of movement of the touch screen input; and
the mapping of the distance component and the direction component to the number of hops and the direction is based on a predefined pixel-distance-to-hops-conversion ratio.

14. The system of claim 13, wherein the predefined pixel-distance-to-hops-conversion ratio is customizable by the user.

15. The system of claim 12, wherein the GUI comprises at least one of an electronic program guide for scheduled television programming, a media-on-demand content browse interface, a media content playback interface, and a media service menu interface for a media service.

16. A physical electronic device that:
provides a graphical user interface ("GUI") having a grid of user selectable options for display on a display screen; and
when a touch-screen-based directional-hop movement mode is active:
receives touch screen input data representative of a touch screen input provided by a user on a touch screen of a remote control device configured to communicate wirelessly with the electronic device, the touch screen input having a distance component and a direction component;
converts the touch screen input to a GUI input associated with the GUI displayed on the display screen by mapping the distance component and the direction component to a number of hops and a direction; and
applies the GUI input to the GUI displayed on the display screen by moving a highlighter object persistently positioned within the GUI and on one user selectable option within the grid of user selectable options at a time away from a currently highlighted user selectable option in the grid of user selectable options by the number of hops in the direction to highlight a different user selectable option in the grid of user selectable options in the GUI; and
when a touch-screen-based free-cursor directional movement mode is active:
receives additional touch screen input data representative of an additional touch screen input provided by the user on the touch screen of the remote control device;
converts the additional touch screen input to an additional GUI input associated with the GUI provided by the electronic device for display on the display screen, the converting comprising mapping a touch screen location of the additional touch screen input to a display screen location; and
applies the additional GUI input to the GUI displayed on the display screen by determining that the display screen location is an off-screen location outside of the display screen and performing a predefined GUI operation associated with the off-screen location.

17. The physical electronic device of claim 16, wherein:
the distance component specifies a number of pixels of the touch screen in a direction of movement of the touch screen input; and
the mapping of the distance component and the direction component to the number of hops and the direction is based on a predefined pixel-distance-to-hops-conversion ratio.

18. The physical electronic device of claim 17, wherein the predefined pixel-distance-to-hops-conversion ratio is customizable by the user.

19. The physical electronic device of claim 16, wherein the GUI comprises at least one of an electronic program guide for scheduled television programming, a media-on-demand content browse interface, a media content playback interface, and a media service menu interface for a media service.

20. The method of claim 1, wherein the number of hops is a plurality of hops and the highlighter object is persistently positioned within the GUI throughout the moving of the highlighter object by consecutively highlighting each user selectable option within the grid of user selectable options along a hop path between the currently highlighted user selectable option and the different user selectable option, the hop path corresponding to the touch screen input.

21. The method of claim 1, wherein the predefined GUI operation associated with the off-screen location includes providing a display window for display in the GUI in superposition over other content displayed within the GUI.

22. The method of claim 1, further comprising, while the touch-screen-based free-cursor directional movement mode is active:
receiving, by the computer-implemented user interface system, more additional touch screen input data representative of a second additional touch screen input provided by the user on the touch screen of the remote control device;
converting, by the computer-implemented user interface system, the second additional touch screen input to a second additional GUI input associated with the GUI provided by the electronic device for display on the display screen, the converting comprising mapping a touch screen location of the second additional touch screen input to a second display screen location; and
applying, by the computer-implemented user interface system, the second additional GUI input to the GUI displayed on the display screen, the applying comprising determining that the second display screen location is an on-screen location within the display screen and providing a visual indication of the second display screen location by displaying, in the GUI displayed on the display screen, a free-cursor indicator moving in real time along a path corresponding to and mapped from the second additional touch screen input.

* * * * *